(12) United States Patent
Satish et al.

(10) Patent No.: US 10,567,424 B2
(45) Date of Patent: *Feb. 18, 2020

(54) DETERMINING SECURITY ACTIONS FOR SECURITY THREATS USING ENRICHMENT INFORMATION

(71) Applicant: Splunk Inc., San Francisco, CA (US)

(72) Inventors: Sourabh Satish, Fremont, CA (US); Oliver Friedrichs, Woodside, CA (US); Atif Mahadik, Fremont, CA (US); Govind Salinas, Sunnyvale, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/107,979

(22) Filed: Aug. 21, 2018

(65) Prior Publication Data

US 2019/0020677 A1    Jan. 17, 2019

Related U.S. Application Data

(63) Continuation of application No. 15/886,183, filed on Feb. 1, 2018, now Pat. No. 10,193,920, which is a
(Continued)

(51) Int. Cl.
*H04L 29/06* (2006.01)
*G06F 21/55* (2013.01)
(Continued)

(52) U.S. Cl.
CPC ........ *H04L 63/1441* (2013.01); *G06F 16/285* (2019.01); *G06F 21/554* (2013.01);
(Continued)

(58) Field of Classification Search
CPC .. H04L 63/20; H04L 63/1433; H04L 63/1441
(Continued)

(56) References Cited

U.S. PATENT DOCUMENTS 6,405,318 B1    6/2002  Rowland et al.
7,076,803 B2    7/2006  Bruton, III et al.
(Continued)

OTHER PUBLICATIONS

Aguirre I., et al., "Improving the Automation of Security Information Management: A Collaborative Approach," IEEE Security & Privacy, vol. 10 (1), Oct. 25, 2011, pp. 55-59.
(Continued)

*Primary Examiner* — Teshome Hailu
(74) *Attorney, Agent, or Firm* — Nicholson De Vos Webster & Elliott LLP

(57) ABSTRACT

Systems, methods, and software described herein provide security actions based on the current state of a security threat. In one example, a method of operating an advisement system in a computing environment with a plurality of computing assets includes identifying a security threat within the computing environment. The method further includes, in response to identifying the security threat, obtaining state information for the security threat within the computing environment, and determining a current state for the security threat within the computing environment. The method also provides obtaining enrichment information for the security threat and determining one or more security actions for the security threat based on the enrichment information and the current state for the security threat.

24 Claims, 5 Drawing Sheets

Related U.S. Application Data continuation of application No. 14/824,262, filed on Aug. 12, 2015, now Pat. No. 9,888,029.

(60) Provisional application No. 62/106,830, filed on Jan. 23, 2015, provisional application No. 62/106,837, filed on Jan. 23, 2015, provisional application No. 62/087,025, filed on Dec. 3, 2014.

(51) Int. Cl.
*G06F 16/28* (2019.01)
*H04L 12/851* (2013.01)

(52) U.S. Cl.
CPC ...... *H04L 63/0236* (2013.01); *H04L 63/1416* (2013.01); *H04L 63/1425* (2013.01); *H04L 63/1433* (2013.01); *H04L 63/20* (2013.01); *H04L 47/2425* (2013.01)

(58) Field of Classification Search
USPC .......................................................... 726/1
See application file for complete search history.

(56) References Cited

U.S. PATENT DOCUMENTS

| | | | |
|---|---|---|---|
| 7,127,743 B1 | 10/2006 | Khanolkar et al. | |
| 7,174,566 B2 | 2/2007 | Yadav et al. | |
| 7,469,301 B2 | 12/2008 | Daniell et al. | |
| 7,900,259 B2 | 3/2011 | Jeschke et al. | |
| 7,950,056 B1 | 5/2011 | Satish et al. | |
| 8,042,171 B1 | 10/2011 | Nordstrom et al. | |
| 8,103,875 B1 | 1/2012 | Ramzan et al. | |
| 8,146,147 B2 | 3/2012 | Litvin et al. | |
| 8,185,953 B2 | 5/2012 | Rothstein et al. | |
| 8,261,317 B2 | 9/2012 | Litvin et al. | |
| 8,291,495 B1 | 10/2012 | Burns et al. | |
| 8,402,540 B2 | 3/2013 | Kapoor et al. | |
| 8,484,338 B2 | 7/2013 | Paster et al. | |
| 8,516,575 B2 | 8/2013 | Burnside et al. | |
| 8,627,466 B2 | 1/2014 | Fisher et al. | |
| 8,676,970 B2 | 3/2014 | Boyns et al. | |
| 8,756,697 B2 | 6/2014 | Ocepek et al. | |
| 8,856,910 B1 | 10/2014 | Rostami-Hesarsorkh et al. | |
| 8,914,878 B2 | 12/2014 | Burns et al. | |
| 8,924,469 B2 | 12/2014 | Raleigh et al. | |
| 8,943,123 B2 | 1/2015 | Miyazaki et al. | |
| 8,949,931 B2 | 2/2015 | Ermagan et al. | |
| 9,009,814 B1* | 4/2015 | Wertz | G06F 21/36 713/168 |
| 9,009,824 B1 | 4/2015 | Chen et al. | |
| 9,049,226 B1 | 6/2015 | Duane et al. | |
| 9,166,995 B1 | 10/2015 | Roundy et al. | |
| 9,256,739 B1 | 2/2016 | Roundy et al. | |
| 9,311,479 B1 | 4/2016 | Manni et al. | |
| 9,325,733 B1 | 4/2016 | Kolman et al. | |
| 9,338,181 B1 | 5/2016 | Burns et al. | |
| 9,489,516 B1 | 11/2016 | Lu et al. | |
| 9,729,572 B1* | 8/2017 | Adams | H04L 63/145 |
| 9,762,607 B2 | 9/2017 | Satish et al. | |
| 9,871,818 B2 | 1/2018 | Satish et al. | |
| 9,954,888 B2 | 4/2018 | Satish et al. | |
| 10,158,663 B2 | 12/2018 | Satish et al. | |
| 10,257,227 B1 | 4/2019 | Stickle et al. | |
| 2004/0003286 A1 | 1/2004 | Kaler et al. | |
| 2004/0054498 A1 | 3/2004 | Shipp et al. | |
| 2004/0111637 A1 | 6/2004 | Baffes et al. | |
| 2005/0055578 A1 | 3/2005 | Wright et al. | |
| 2005/0235360 A1* | 10/2005 | Pearson | H04L 29/06 726/23 |
| 2006/0048209 A1 | 3/2006 | Shelest et al. | |
| 2006/0117386 A1* | 6/2006 | Gupta | G06F 21/55 726/23 |
| 2007/0168874 A1 | 7/2007 | Kloeffer et al. | |
| 2008/0005782 A1 | 1/2008 | Aziz et al. | |
| 2008/0082662 A1 | 4/2008 | Dandliker et al. | |
| 2008/0289028 A1 | 11/2008 | Jansen et al. | |
| 2009/0037548 A1 | 2/2009 | Ordille et al. | |
| 2010/0162347 A1* | 6/2010 | Barile | G06F 21/552 726/1 |
| 2010/0169973 A1* | 7/2010 | Kim | G06F 21/566 726/23 |
| 2010/0251329 A1 | 9/2010 | Wei et al. | |
| 2010/0319004 A1 | 12/2010 | Hudson et al. | |
| 2010/0325685 A1 | 12/2010 | Sanbower et al. | |
| 2012/0331553 A1 | 12/2012 | Aziz et al. | |
| 2013/0007882 A1 | 1/2013 | Devarajan et al. | |
| 2013/0081141 A1* | 3/2013 | Anurag | G06F 21/55 726/23 |
| 2013/0291106 A1 | 10/2013 | Simonoff et al. | |
| 2013/0312092 A1 | 11/2013 | Parker et al. | |
| 2014/0082726 A1 | 3/2014 | Dreller et al. | |
| 2014/0165207 A1 | 6/2014 | Engel et al. | |
| 2014/0199663 A1 | 7/2014 | Sadeh-Koniecpol et al. | |
| 2014/0237599 A1 | 8/2014 | Gertner et al. | |
| 2014/0259170 A1 | 9/2014 | Amsler et al. | |
| 2014/0310811 A1 | 10/2014 | Hentunen et al. | |
| 2014/0344926 A1 | 11/2014 | Cunningham et al. | |
| 2014/0351441 A1 | 11/2014 | Madani et al. | |
| 2015/0040217 A1* | 2/2015 | Abuelsaad | H04L 63/1408 726/22 |
| 2015/0215325 A1 | 7/2015 | Ogawa et al. | |
| 2015/0222647 A1 | 8/2015 | Lietz et al. | |
| 2015/0334132 A1 | 11/2015 | Zömbik et al. | |
| 2015/0341384 A1 | 11/2015 | Mandayam et al. | |
| 2015/0365438 A1 | 12/2015 | Carver et al. | |
| 2015/0381641 A1 | 12/2015 | Cabrera et al. | |
| 2016/0006749 A1 | 1/2016 | Cohen et al. | |
| 2016/0072836 A1 | 3/2016 | Hadden et al. | |
| 2016/0103992 A1 | 4/2016 | Roundy et al. | |
| 2016/0119379 A1 | 4/2016 | Nadkarni et al. | |
| 2016/0164893 A1* | 6/2016 | Levi | H04L 63/1416 726/23 |
| 2017/0237762 A1 | 8/2017 | Ogawa et al. | |

OTHER PUBLICATIONS

Final Office Action from U.S. Appl. No. 14/677,493 dated Aug. 24, 2017, 29 pages.
Final Office Action from U.S. Appl. No. 14/824,262, dated Apr. 6, 2017, 22 pages.
Non-Final Office Action from U.S. Appl. No. 16/107,972, dated Dec. 31, 2018, 11 pages.
Non-Final Office Action from U.S. Appl. No. 16/107,975, dated Jan. 4, 2019, 11 pages.
Non-Final Office Action from U.S. Appl. No. 14/689,973, dated Jan. 25, 2017, 18 pages.
Non-Final Office Action from U.S. Appl. No. 14/824,262, dated Jul. 13, 2017, 20 pages.
Non-Final Office Action from U.S. Appl. No. 14/824,262, dated Oct. 7, 2016, 16 pages.
Non-Final Office Action from U.S. Appl. No. 15/699,454, dated Feb. 8, 2018, 19 pages.
Non-Final Office Action from U.S. Appl. No. 15/886,183, dated Mar. 22, 2018, 21 pages.
Notice of Allowance from U.S. Appl. No. 14/689,973, dated Aug. 10, 2017, 6 pages.
Notice of Allowance from U.S. Appl. No. 14/689,973, dated Jul. 27, 2017, 33 pages.
Notice of Allowance from U.S. Appl. No. 14/824,262, dated Jan. 5, 2018, 4 pages.
Notice of Allowance from U.S. Appl. No. 14/824,262, dated Nov. 22, 2017, 7 pages.
Notice of Allowance from U.S. Appl. No. 15/699,454, dated Aug. 9, 2018, 11 pages.
Notice of Allowance from U.S. Appl. No. 15/699,454, dated Nov. 20, 2018, 6 pages.
Notice of Allowance from U.S. Appl. No. 15/886,183, dated Sep. 19, 2018, 9 pages.

(56) References Cited

OTHER PUBLICATIONS

Paudice A., et al., "An Experiment with Conceptual Clustering for the Analysis of Security Alerts," IEEE International Symposium on Software Reliability Engineering Workshops, Nov. 3-6, 2014, pp. 335-340.
Final Office Action from U.S. Appl. No. 14/674,679, dated Sep. 22, 2016, 19 pages.
Final Office Action from U.S. Appl. No. 14/675,176, dated Nov. 25, 2016, 21 pages.
Final Office Action from U.S. Appl. No. 14/675,176, dated Sep. 25, 2017, 31 pages.
Final Office Action from U.S. Appl. No. 14/677,493, dated Nov. 13, 2018, 20 pages.
Final Office Action from U.S. Appl. No. 14/677,493, dated Nov. 25, 2016, 23 pages.
Final Office Action from U.S. Appl. No. 14/868,553, dated Oct. 15, 2018, 19 pages.
Final Office Action from U.S. Appl. No. 14/868,553, dated Oct. 18, 2017, 31 pages.
Final Office Action from U.S. Appl. No. 14/956,589, dated Nov. 22, 2017, 27 pages.
Final Office Action from U.S. Appl. No. 15/924,759, dated Aug. 1, 2018, 13 pages.
Non-Final Office Action from U.S. Appl. No. 16/182,914, dated May 30, 2019, 23 pages.
Non-Final Office Action from U.S. Appl. No. 14/674,679, dated Jun. 2, 2016, 16 pages.
Non-Final Office Action from U.S. Appl. No. 14/675,075, dated Jul. 11, 2016, 13 pages.
Non-Final Office Action from U.S. Appl. No. 14/675,176, dated Apr. 17, 2017, 22 pages.
Non-Final Office Action from U.S. Appl. No. 14/675,176, dated Jul. 18, 2016, 18 pages.
Non-Final Office Action from U.S. Appl. No. 14/677,493, dated Aug. 2, 2019, 26 pages.
Non-Final Office Action from U.S. Appl. No. 14/677,493, dated Jul. 11, 2016, 17 pages.
Non-Final Office Action from U.S. Appl. No. 14/677,493, dated May 1, 2017, 25 pages.
Non-Final Office Action from U.S. Appl. No. 14/677,493, dated May 14, 2018, 23 pages.
Non-Final Office Action from U.S. Appl. No. 14/689,926, dated May 8, 2017, 34 pages.
Non-Final Office Action from U.S. Appl. No. 14/868,553, dated Mar. 26, 2018, 22 pages.
Non-Final Office Action from U.S. Appl. No. 14/868,553, dated May 26, 2017, 45 pages.
Non-Final Office Action from U.S. Appl. No. 14/956,589, dated May 31, 2017, 33 pages.
Non-Final Office Action from U.S. Appl. No. 14/956,615, dated Jul. 28, 2017, 46 pages.
Non-Final Office Action from U.S. Appl. No. 15/845,963, dated Feb. 12, 2018, 27 pages.
Non-Final Office Action from U.S. Appl. No. 15/924,759, dated Feb. 26, 2019, 20 pages.
Non-Final Office Action from U.S. Appl. No. 16/142,913, dated Apr. 30, 2019, 33 pages.
Notice of Allowance from U.S. Appl. No. 16/107,972, dated May 9, 2019, 18 pages.
Notice of Allowance from U.S. Appl. No. 16/107,975, dated May 13, 2019, 18 pages.
Notice of Allowance from U.S. Appl. No. 16/142,913, dated Aug. 30, 2019, 21 pages.
Notice of Allowance from U.S. Appl. No. 14/674,679, dated Apr. 18, 2017, 20 pages.
Notice of Allowance from U.S. Appl. No. 14/674,679, dated Jun. 20, 2017, 5 pages.
Notice of Allowance from U.S. Appl. No. 14/674,679, dated May 12, 2017, 4 pages.
Notice of Allowance from U.S. Appl. No. 14/689,926, dated Dec. 20, 2017, 6 pages.
Notice of Allowance from U.S. Appl. No. 14/689,926, dated Nov. 8, 2017, 22 pages.
Notice of Allowance from U.S. Appl. No. 14/956,589, dated Apr. 23, 2018, 21 pages.
Notice of Allowance from U.S. Appl. No. 14/956,615, dated Dec. 18, 2017, 19 pages.
Notice of Allowance from U.S. Appl. No. 15/845,963, dated Jun. 26, 2018, 11 pages.
Notice of Allowance from U.S. Appl. No. 15/924,759, dated Jun. 13, 2019, 21 pages.

* cited by examiner

DETERMINING SECURITY ACTIONS FOR SECURITY THREATS USING ENRICHMENT INFORMATION

RELATED APPLICATIONS

This application is a continuation of, and claims the benefit of priority to, U.S. application Ser. No. 15/886,183, filed on Feb. 1, 2018, entitled "MANAGING SECURITY ACTIONS IN A COMPUTING ENVIRONMENT BASED ON COMMUNICATION ACTIVITY OF A SECURITY THREAT," which is a continuation of U.S. application Ser. No. 14/824,262, filed on Aug. 12, 2015, entitled "CLASSIFYING KILL-CHAINS FOR SECURITY ACTIONS," issued as U.S. Pat. No. 9,888,029, which itself claims priority to U.S. Provisional Patent Application No. 62/087,025, entitled "ACTION RECOMMENDATIONS FOR COMPUTING ASSETS BASED ON ENRICHMENT INFORMATION," filed on Dec. 3, 2014, U.S. Provisional Patent Application No. 62/106,830, entitled "ACTION RECOMMENDATIONS FOR ADMINISTRATORS IN A COMPUTING ENVIRONMENT," filed on Jan. 23, 2015, and U.S. Provisional Patent Application No. 62/106,837, entitled "SECURITY ACTIONS IN A COMPUTING ENVIRONMENT," filed on Jan. 23, 2015, all of which are hereby incorporated by reference in their entirety.

TECHNICAL FIELD

Aspects of the disclosure are related to computing environment security, and in particular to defining kill-chains for security incidents to assist in identifying security actions for a computing environment.

TECHNICAL BACKGROUND

An increasing number of data security threats exist in the modern computerized society. These threats may include viruses or other malware that attacks the local computer of the end user, or sophisticated cyber attacks to gather data and other information from the cloud or server based infrastructure. This server based infrastructure includes real and virtual computing devices that are used to provide a variety of services to user computing systems, such as data storage, cloud processing, web sites and services, amongst other possible services. To protect applications and services, various antivirus, encryption, and firewall implementations may be used across an array of operating systems, such as Linux and Microsoft Windows.

Further, some computing environments may implement security information and event management (SIEM) systems and other security detection systems to provide real-time analysis of security alerts generated by network hardware and applications. In particular, SIEM systems allow for real-time monitoring, correlation of events, notifications, and console views for end users. Further, SIEM systems may provide storage logs capable of managing historical information about various security events within the network. Although SIEMs and other security identifying systems may generate security alerts for devices within the network, administrators may be forced to translate each of these alerts into particular actions, and may further be forced to gather additional information about the alert before taking the action. Thus, time and resources that could be used on other tasks may be used in researching and determining an appropriate course of action to handle a security threat.

Overview

The technology disclosed herein enhances how security actions are determined in response to security threats for a computing environment. In one example, an advisement system is configured to identify a security threat within a computing environment comprising a plurality of computing assets. The advisement system is further configured to, in response to identifying the security threat, obtain state information for the security threat within the computing environment, and determine a current state for the security threat within the computing environment. The advisement system is also configured to obtain enrichment information for the security threat, and determine one or more security actions for the security threat based on the enrichment information and the current state for the security threat.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
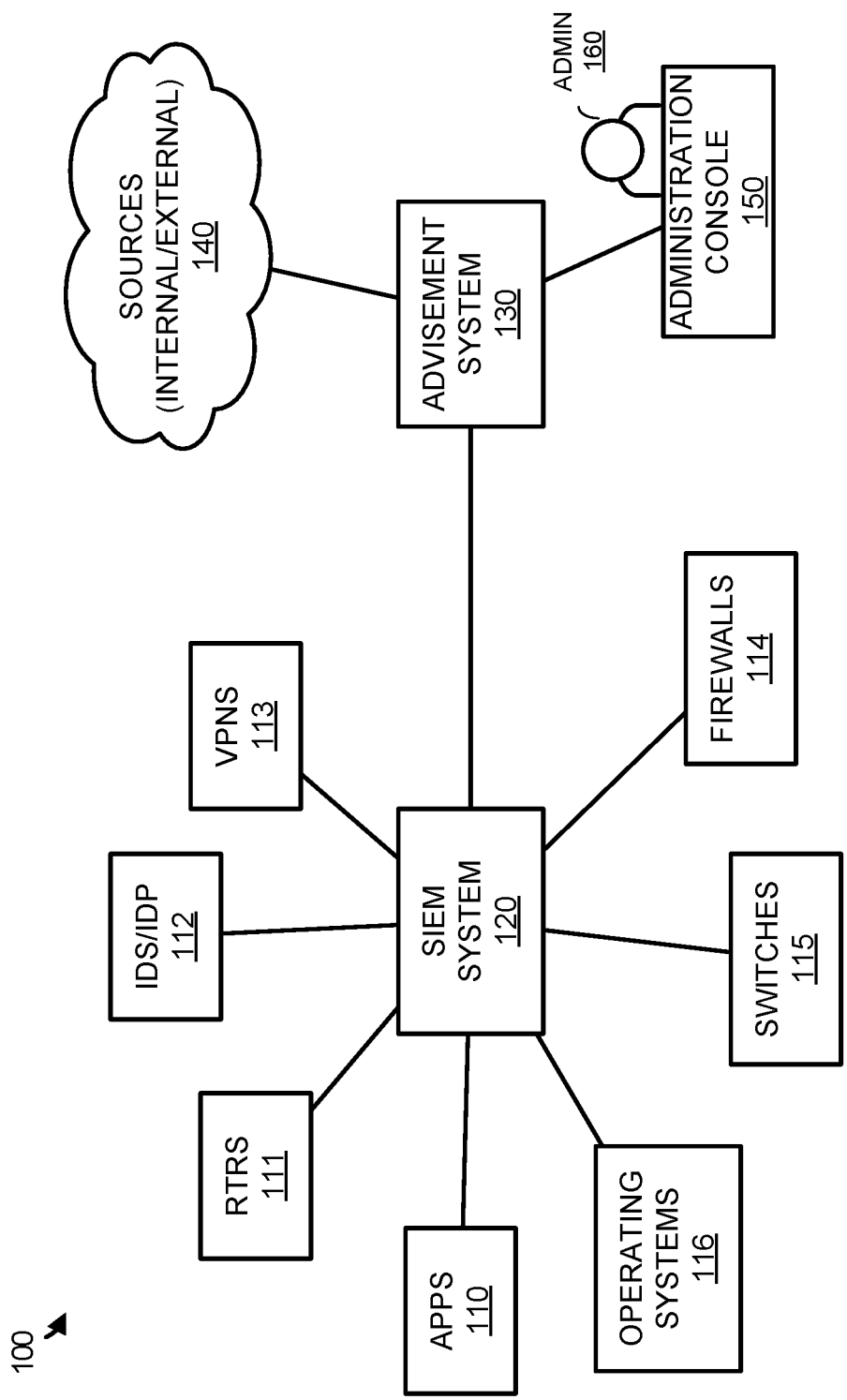
FIG. 1 illustrates a computing environment to manage security actions for a plurality of network assets.

The various examples disclosed herein provide for identifying security actions using kill-state information related to the particular security threat. In many situations, organizations may employ a variety of computing assets, which may include various hardware and processes. During the operation of the hardware and process, security incidents may occur, which inhibit the operation of the assets and the environment as a whole. In some implementations, security-monitoring systems, such as security information and event management (SIEM) systems or local security process on each computing element, may identify a security incident or threat.

In response to identifying the security threat, information about the threat may be transferred or passed to an advisement system to determine a course of action to take against the security threat. In at least one example, responsive to identifying a security incident, the advisement system may obtain enrichment information about the incident from internal and external sources. These sources may include websites, databases, or other similar sources that maintain information about various threats that could be present within the organization's computing assets. For example, an unknown process may be identified as a security threat for a computing asset. In response to identifying the unknown process, the advisement system may query a database to determine if the unknown process is malicious.

Once the enrichment information is obtained with regards to the incident, the advisement system may identify a rule set for the incident based on the enrichment information, and determine a set of action recommendations based on the rule set. These action recommendations may include a variety of procedures that eliminate, segregate, monitor, or provide other similar actions on the identified threat. For example, if the enrichment information indicated that an unknown process was malicious, the action suggestions that are identified for the incident may include segregating the affected computing asset from other computing assets in the environment, removing files and other objects from the affected computing asset related to the malicious process, further monitoring the actions of the malicious process, or other similar operations that are directed at the malicious process.

Here, to aid in determining the actions to be taken against a particular threat, the advisement system may be configured to obtain kill-state information for the threat. This kill-state information may include information about the behavior of the threat, such as whether the threat is reaching out to other systems within the environment, whether the threat is scanning ports within the environment to gather information about the configuration of the environment, whether the threat is attempting to remove data from particular assets, whether the threat is attempting to migrate to other assets in the environment, or any other similar information. Based on the information, which may be gathered from the affected asset, as well as other assets within the environment, the advisement system may determine a current state for the security threat. This state may include a reconnaissance state, which corresponds to threats that are attempting to gather information about the structure of the computing environment, an exploit state, wherein the threat is attempting to gain access to a particular unapproved portion of the computing environment, a persist state, wherein the threat is attempting to remain active in the particular asset, a lateral movement state, wherein the threat is attempting to move to other assets within the environment, an exfiltration state, wherein the threat is attempting to removed data from the environment, or any other similar state related to the threat.

To determine that a threat is in a reconnaissance state, the advisement system may monitor the incoming connections from external computing systems to determine whether internet protocol (IP) addresses, media access control (MAC) address, ports, and other similar identification information is sought by the external system. To determine that a threat is in an exploit state, the advisement system may identify that a few internal connections were made along with an attempt to install or make available processes for data transfer tools. To determine that a threat is in a persist state, the advisement system may monitor the installation and execution of unknown processes related to the security threat on affected assets within the environment. To determine that a threat is in a lateral movement state, the advisement system may monitor the number of connections between assets in the environment, the types of assets that are communicating in the environment, the relation of internal connections to external connections by the threat, or other similar information related to the threat. To determine that a threat is in an exfiltration state, the advisement system may monitor the existence of data transfer tools on systems related to the threat, may monitor the outbound connections from affects assets, may monitor the amount of data movement from an asset to a system external from the environment, or may monitor other similar attributes to the system. These are just some examples of determining the current state of a threat, it should be understood that other examples of determining the current state may exist and are in the scope of the present disclosure.

Once the current state is determined for the threat, one or more security actions may be identified to respond to the threat based on the current state and the enrichment information. In some implementations, the enrichment information may be used to identify a rule set for the threat. For example, if an unknown process is identified as executing on an asset, one or more internal and external sources may be used to identify the type of threat that the process presents to the environment, such as a Trojan, virus, or some other threat. Once the rule set is identified, the state of the threat may be used to determine what actions, which are associated with the rule set, are going to be used to respond to the threat. Accordingly, a threat that is in a reconnaissance state may not have the same actions identified as a threat that is in an exfiltration state.

In some examples, the enrichment information obtained from the internal and external sources may relate kill-state information to the identity of the threat. For example, if an unknown process were identified on an asset within the environment, an identifier for the process may be used to search for kill-state information about the process. This identifier may include the name of the process, a vendor signature associated with the process, or any other similar identifier for the threat. Once the identifier information is provided to the sources, the sources may search their databases and data structures to identify related threats that are identical or closely resemble the identifier information provided by the advisement system. Once related threats are identified, kill-state information, such as the routine or timing of operations by the unknown process, may be provided to the advisement system. This routine or timing of operations may indicate a timeline of what state occurs at what time, and what should be observed in the environment during each particular state. Using the unknown process example above, at a first observation time of the environment, a first kill-state may be identified by the advisement system, whereas at a second observation time of the environment, a second kill-state may be identified by the advisement system. These different states may then be related to different actions to remedy or mitigate the threat.

In some implementations, the actions that are identified for the threat may be implemented without receiving feedback from an administrator of the environment. However, in addition to or in place of the automated response, the advisement system may provide the identified actions as suggestions to an administrator associated with the computing environment. Once the action suggestions are provided, the administrator may select one or more of the actions, causing the actions to be implemented within the environment.

In some examples, the advisement system may be configured with connectors or other software modules that can be used to automate the implementation of particular security actions. These connectors may be developed to provide particular operations for various hardware and software configurations. Accordingly, if a security action is selected to implement a firewall rule, one connector may be used for a first firewall distributor, and a second connector may be used for the second firewall distributor. Consequently, rather than going through the procedures to implement a security action across a plurality of hardware and software platforms, the connectors may be used to implement a generic action across the computing environment.

To further illustrate the operation of an advisement system within a computing network, FIG. 1 is provided. FIG. 1 illustrates a computing environment 100 to manage security actions for a plurality of network assets. Computing environment 100 includes computing assets 110-116, SIEM system 120, advisement system 130, sources 140, and administration console 150. Computing assets 110-116 include applications 110, routers (rtrs) 111, intrusion detection systems and intrusion prevention system (IDS/IDP) 112, virtual private networks (VPNs) 113, firewalls 114, switches 115, and operating systems 116, although other assets may exist. Assets 110-116 may execute via any number of computing systems or devices. In addition to the routers and switches, these computing devices may include server computers, desktop computers, laptop computers, tablet computers, and the like. Although not illustrated in the present example, in some implementations, assets may be defined at computing system level. Accordingly, assets may be defined as physical computing systems, such as servers, end user computing systems, host computing systems, and the like, and may further be defined as virtual computing systems, such as virtual machines executing via host computing systems. These physical and virtual computing systems may include an operating system, applications, processes, firewalls, and other similar computing resources.

SIEM system 120, advisement system 130, internal and external sources 140, and administration console 150 may each include communication interfaces, network interfaces, processing systems, computer systems, microprocessors, storage systems, storage media, or some other processing devices or software systems, and can be distributed among multiple devices. SIEM system 120, advisement system 130, and sources 140 may comprise one or more server, desktop, laptop, or other similar computing devices. Administration console 150 may comprise an end user device, such as a desktop computer, laptop computer, smartphone, tablet, or any other similar computing device.

Advisement system 130 communicates with SIEM system 120, sources 140, and administration console 150 via communication links that may use Time Division Multiplex (TDM), asynchronous transfer mode (ATM), internet protocol (IP), Ethernet, synchronous optical networking (SONET), hybrid fiber-coax (HFC), circuit-switched communication signaling, wireless communications, or some other communication format, including combinations and improvements thereof. Similarly, SIEM system 120 may gather information from assets 110-116 via a plurality of communication links to the computing systems associated with the assets, wherein the links may use TDM, ATM, IP, Ethernet, SONET, HFC, circuit-switched communication signaling, wireless communications, or some other communication format, including combinations and improvements thereof. While not illustrated in the present example, it should be understood that advisement system 130 might communicate with the assets over various communication links and communication formats to implement desired security actions, or to receive an incident report.

In operation, SIEM system 120 receives data and performance information from assets 110-116 and performs inspections to identify possible security issues. Once SIEM system 120 identifies a possible security threat, information about the security threat is transferred to advisement system 130. Advisement system 130 identifies the security threat and analyzes the threat using sources 140 to determine actions to be taken against the threat. Once the actions are identified, the actions may be implemented without administrator interaction by advisement system 130, or in the alternative, the actions may be transferred, via email, text message, or other similar format, to administration console 150 to be presented to administrator 160. Once presented, administrator 160 may select one or more of the actions, which may then be implemented by advisement system 130.

Figure 2:
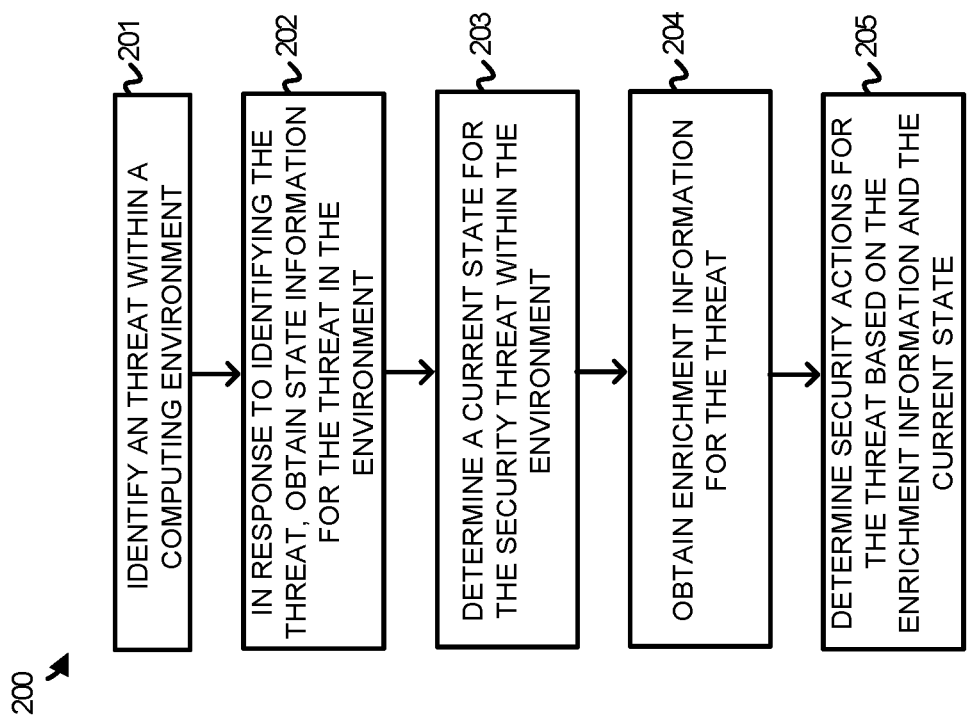
FIG. 2 illustrates a method of operating an advisement system to implement actions in computing assets based on a kill-state of a security threat.

To further illustrate the operation of computing environment 100, FIG. 2 is provided. FIG. 2 illustrates a method 200 of operating advisement system 130 to implement actions in computing assets based on a kill-state of a security threat. In particular, as described in FIG. 1, SIEM system 120 receives information from a plurality of network assets 110-116 and identifies security threats based on the information. Once a threat is identified, the threat is transferred to advisement system 130. Advisement system 130 identifies the security threat or incident within computing environment 100 (201), and in response to identifying the incident, obtains state information for the threat in computing environment 100 (202). This state information may include various information about the behavior of the threat, including the number of communications initiated by the threat, the type of information seeking to be obtained by the threat, the type of computing systems targeted by the threat, the communication path of the threat, the number of other systems in the environment being communicated with by the threat, or any other similar information about the behavior of the threat. The information may be obtained by the system affected by the threat, and may also be provided by other systems or assets within the computing environment. For example, if communications related to the security threat involved a large number of internal assets to the computing environment, the information may be useful in identifying that the threat is in a lateral stage within the environment.

Once the state information is obtained, advisement system 130 determines a current state for the security threat within the environment (203). As described herein, threats within a computing environment may have various activity states within the various assets. These states may include a reconnaissance state, which corresponds to threats that are attempting to gather information about the structure of the computing environment, an exploit state, wherein the threat is attempting to gain access to a particular unapproved portion of the computing environment, a persist state, wherein the threat is attempting to remain active in the particular asset, a lateral movement state, wherein the threat is attempting to move to other assets within the environment, an exfiltration state, wherein the threat is attempting to remove data from the environment, or any other similar state related to the threat. Accordingly, a first action may be preferred against a threat in a first state, whereas a second action may be preferred against a threat in a second state. For example, a threat that is attempting to contact or move laterally to other systems in the computing environment may have a different security action response than a threat that is attempting to move or exfiltrate data to an external system from the computing environment.

In addition to determining information about the state of a threat, advisement system 130 obtains enrichment information related to the threat (204). Specifically, advisement system 130 may identify properties or traits of the incident, such as the internet protocol (IP) address related to the threat, distributor information for the threat, the computing device for the incident, the host, the user, any uniform resource locators (URLs) associated with the incident, or any other threat information specific to the security incident. Once the properties are identified, advisement system 130 may identify information related to the threat using internal and external sources 140. These sources may include databases or websites that keep track of malicious IP addresses or domain names, the type of threats presented from the particular domain names, identities of malware, Trojans, and viruses, amongst a variety of other information.

Upon determining enrichment information related to a particular threat, advisement system 130 determines security actions for the threat based on the enrichment information and current state (205). These actions may include blocking a particular IP address, removing a particular process from a computing asset, moving one or more computing assets to a virtual local area network (VLAN), limiting the outgoing and incoming communications at an asset, or any other similar action. In some implementations, the security actions may be implemented without external approval from an administrator. In addition to or in place of the automated action, the actions may be supplied to an administrator associated with the computing environment. Once provided, either locally at advisement system 130 or externally at administration console 150, the administrator may select one or more of the actions to be implemented within the environment. Upon selection by the administrator, advisement system 130 identifies or obtains the selection, and initiates implementation of the selected action.

In some examples, to determine the security actions for the threat, advisement system 130 may determine a rule set for the particular threat based on the enrichment information. For instance, various rule sets may be defined within data structures that are accessible by advisement computing system 130. These rule sets may include separate rule sets for viruses, denial of service attacks, malware attacks, or any other similar type of identified process based on the enrichment information. Once a rule set is determined, advisement system 130 may identify the security actions associated with the rule set based on the current state. In some implementations, each rule set may be associated with a plurality of actions that can be taken against a particular threat or incident. To select a subset of actions associated with the rule set, the current state may be defined for the threat, and based on the current state, specific actions associated with the rule set may be selected. As a result, actions for a threat in a first state may be different from the actions for the same threat in a second state.

In some implementations, a database of security actions may be stored within one or more data structures accessible to the advisement system, which allow the advisement system to select actions based on the type of threat and the current state of the threat. In some examples, the security actions may be associated with keywords, allowing the advisement system to identify all actions associated with particular keywords. For instances, if the advisement system determined that a threat was a virus in an exfiltration state, the advisement system may search the one or more data structures for actions related to "virus" and "exfiltration state." These actions may then be selected for the particular threat.

Although illustrated in FIG. 1 with a SIEM system, it should be understood that other systems might be used to identify security threats. For example, other security monitoring systems, users within the environment, or the assets may directly notify advisement system 130 of a security threat. Further, although illustrated separate in the example of FIG. 1, it should be understood that SIEM system 120 might reside wholly or partially on the same computing systems as advisement system 130.

Figure 3:
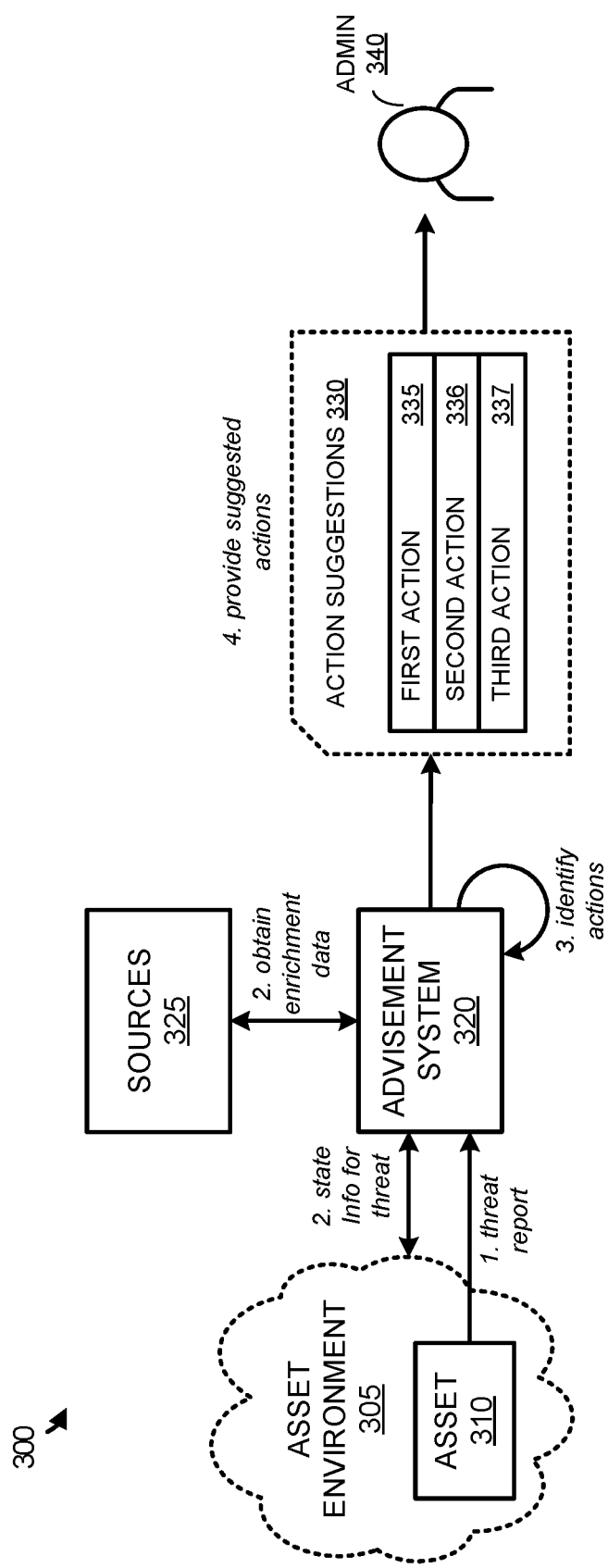
FIG. 3 illustrates an operational scenario of identifying security actions based on kill-state information.

Turning to FIG. 3, FIG. 3 illustrates an operational scenario 300 of identifying security actions based on kill-state information. Operational scenario 300 includes asset environment 305, asset 310, advisement system 320, sources 325, action suggestions 330, and administrator 340. Asset environment 305 includes a plurality of computing assets, including asset 310. Asset 310 may comprise a server computing system, end user computing system, virtual computing system, router, or some other computing asset.

In operation, a SIEM system, security processes on the computing assets, or other similar security processes identify a security threat associated with asset 310, and notifies advisement system 320 of the threat. In response to being notified of the threat, advisement system 320 obtains state information for the threat from asset environment 305, and further gathers enrichment information for the threat from sources 325. The state information for the threat corresponds to the current behavior expressed by the threat, which may include the number of times that a threat has been identified within the environment, whether the threat is attempting to reach out to other assets in the environment, whether the threat is attempting to contact an outside computing system, whether the threat is attempting to gain access to a particular computing system, or other similar information from asset environment 305. The state information may be gathered from the asset associated with the identified threat, and may also be gathered from one or more other computing assets within the environment. Once the state information is obtained from asset environment 305, advisement system 320 may determine a current state for the threat within the environment based on the state information. These states may include, but are not limited to, a reconnaissance state, an exploit state, a persist state, a lateral movement state, or an exfiltration state. For example, if a threat located on an affected asset were attempting to communicate with a plurality of other assets within the environment, then the threat may be determined to be in a lateral movement state. In another example, if the device were attempting to move a threshold amount of data to a system external to the network, then it may be determined that the system is in an exfiltration state. Further, if it were identified that the threat was attempting to install software or a process on an affected asset, then it might be determined that the threat is in a persist state.

Before, during, or after determining the state of the threat within the environment, advisement system 320 may obtain enrichment information from sources 325. Sources 325 may correspond to internal or external databases or websites that store information about the various possible threats to asset environment 305. For example, when an unknown IP address is attempting to access asset 310, advisement system 320 may query sources 325 to determine information about the unknown IP address, such as whether the IP address is known to be malicious or any other information. In some implementations, the enrichment information may include state information or timing of operations for the security threat. This timing of operations information may indicate what should be observed in the environment during each particular state of the threat. Accordingly, at a first observation time of the environment, a first kill-state may be identified by the advisement system, whereas at a second observation time of the environment, a second kill-state may be identified by the advisement system.

Once the enrichment information and the current state are identified for the security threat, advisement system 320 may determine actions to be taken against the security threat. In particular, advisement system 320 generates action suggestions 330 based on the enrichment information and the current state of the threat. Once generated, actions 335-337 are provided to administrator 340 either locally through a user interface on advisement system 320, or through an external administration console. In response to receiving action suggestions 330, administrator 340 may select at least one of actions 335-337 to be implemented within asset environment 305. Once selected, advisement system 320 may initiate implementation of the actions within the environment.

In some implementations, advisement system 320 may be configured with software modules or connectors that can be used in implementing a particular action for asset environment 305. These connectors allow an action command in a first language from an administrator to be translated to the various action processes necessary to implement the action in various hardware and software configurations. For example, the administrator may specify in the first language to "block IP address Alpha on computing assets X and Y." In response to the command, advisement system 320 may translate the command into the processes necessary to block IP address Alpha on computing assets X and Y, even if computing assets X and Y possess different hardware or software configurations. These actions may include logging into the necessary computing asset, and implementing one or more procedures in the computing asset to block the necessary IP address.

Figure 4:
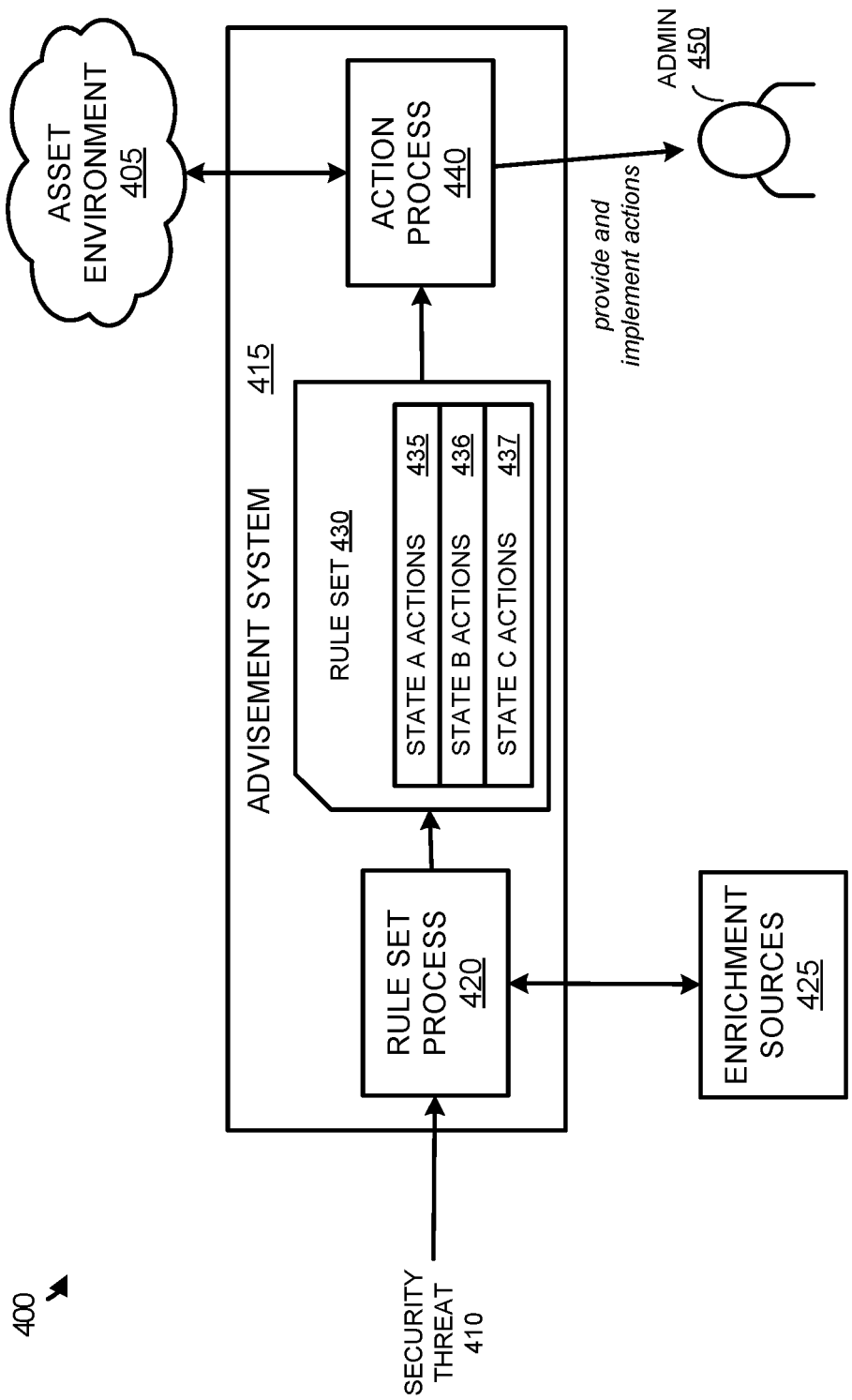
FIG. 4 illustrates an operational scenario for operating an advisement system to provide security actions based on the kill-state of a security threat.

Referring now to FIG. 4 to further demonstrate the selection of actions from a rule set. FIG. 4 illustrates an operational scenario 400 for operating an advisement system to provide security actions based on the kill-state of a security threat. Operational scenario 400 includes security threat 410, asset environment 405, advisement system 415, enrichment sources 425, and administrator (admin) 450.

As depicted advisement system 415 is configured to identify security threat 410 within a computing environment. This identification could be transferred from a SIEM system or other security-monitoring module, or may be transferred from the assets within the computing environment. Once the security threat is identified, rule set process 420 identifies a rule set for the particular threat. Here, to identify the threat, advisement system 415 may query enrichment sources 425, which may comprise websites and other similar databases, to determine information about the threat. This information may include whether the threat is malicious, what data the threat is attempting to obtain, or other similar various characteristics about the threat. Based on the enrichment information, rule set 430 is determined with state actions 435-437 that correspond to the various states of the particular threat. These states may include a reconnaissance state, an exploit state, a persist state, lateral movement state, an exfiltration state, or any other similar state.

Once the rule set is determined by advisement system 415, action process 440 may be used to identify security actions to respond to security threat 410. To determine the appropriate set of actions, action process 440 may obtain state information for the threat within asset environment 405. Asset environment 405, which includes the one or more assets affected by security threat 410 as well additional computing assets, may provide information about the threat including the number of times that the threat has been detected, the communication traits for the threat within the environment, the types of data that the threat is attempting to access, the current operational characteristics of the threat, or any other similar state related information. Based on the state information, a state for the threat is determined, and applied to rule set 430 to determine the appropriate security actions to respond to the threat. Accordingly, state A actions 435 may comprise different actions than state B or C actions 436-437. For example, if a threat were in a reconnaissance state, a first set of actions may be provided for that state. In contrast, if the threat were in a data exfiltration state, a different, and possibly more drastic set of actions may be selected for threat. Further, in some examples, the actions that are provided to the administrator may be ranked or provided in a specific order to the administrator, allowing the administrator to select the action that is best suited for the current state of the threat.

In some implementations, upon determination of the one or more security actions, advisement system 415 may initiate implementation of the security actions within the asset environment. These actions may include making modifications to one or more firewalls in the asset environment, removing processes from the environment, segregating one or more of the assets from other assets in the environment, or any other similar action including combinations thereof. In other implementations, the identified security actions may be provided to administrator 450, allowing administrator 450 to select the desired actions. Once the administrator selects the actions, advisement system 415 may initiate implementation of the actions within the environment.

In some examples, advisement system 415 may have access to connectors or other modules that can be used to deploy security actions across a variety of hardware and software configurations. For instance, an administrator may select, using a unified command language, to block a particular IP address from a plurality of computing assets in the environment. Once specified by the administrator, the action selection may be translated into the necessary processes for the plurality of computing assets based on the hardware and software configurations for the computing assets. As a result, the process for implementing the IP address block in a first computing asset may be different than the process for implementing the IP address block in a second computing asset.

Figure 5:
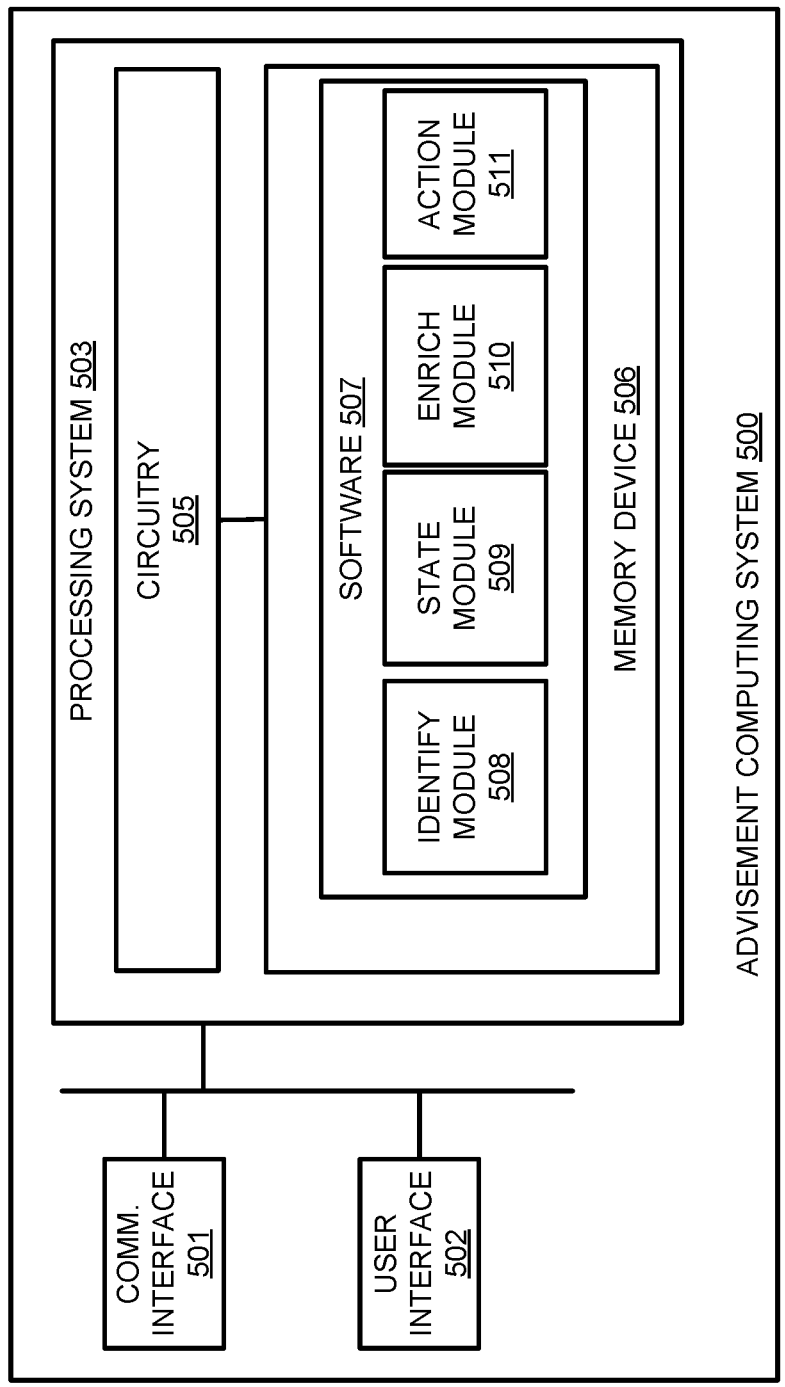
FIG. 5 illustrates an advisement computing system to provide security actions for a plurality of network assets.

FIG. 5 illustrates an advisement computing system 500 to provide security actions for a plurality of network assets. Advisement computing system 500 is representative of a computing system that may be employed in any computing apparatus, system, or device, or collections thereof, to suitably implement the advisement systems described herein. Computing system 500 comprises communication interface 501, user interface 502, and processing system 503. Processing system 503 is communicatively linked to communication interface 501 and user interface 502. Processing system 503 includes processing circuitry 505 and memory device 506 that stores operating software 507.

Communication interface 501 comprises components that communicate over communication links, such as network cards, ports, radio frequency (RF) transceivers, processing circuitry and software, or some other communication devices. Communication interface 501 may be configured to communicate over metallic, wireless, or optical links. Communication interface 501 may be configured to use TDM, IP, Ethernet, optical networking, wireless protocols, communication signaling, or some other communication format—including combinations thereof. In particular, communication interface 501 may communicate with security identification systems, such as SIEM systems, security systems on the assets themselves, or some other security identification system. Further, communication interface 501 may be configured to communicate with one or more administration consoles to provide the suggested actions to administrators, and the computing assets of the environment to implement selected actions.

User interface 502 comprises components that interact with a user. User interface 502 may include a keyboard, display screen, mouse, touch pad, or some other user input/output apparatus. User interface 502 may be omitted in some examples.

Processing circuitry 505 comprises microprocessor and other circuitry that retrieves and executes operating software 507 from memory device 506. Memory device 506 comprises a non-transitory storage medium, such as a disk drive, flash drive, data storage circuitry, or some other memory apparatus. Operating software 507 comprises computer programs, firmware, or some other form of machine-readable processing instructions. Operating software 507 includes identify module 508, state module 509, enrichment (enrich) module 510, and action module 511, although any number of software modules may provide the same operation. Operating software 507 may further include an operating system, utilities, drivers, network interfaces, applications, or some other type of software. When executed by circuitry 505, operating software 507 directs processing system 503 to operate advisement computing system 500 as described herein.

In particular, identify module 508 when executed by processing system 503 is configured to identify a security threat within a computing environment that comprises a plurality of computing assets. This threat may include an unknown process executing on one or the computing assets, an unknown communication identified within the computing assets, unpredictable behavior for one or more of the computing assets, irregular behavior for one or more of the assets, or any other security threat. In some examples, a SIEM system or other security-monitoring module may identify a threat and, in turn, notify computing system 500 of the threat. However, in other examples, the computing assets may directly notify computing system 500 of the threat.

Once identified by computing system 500, state module 509 directs processing system 503 to obtain state information for the security threat within the computing environment. This state information may include various characteristics associated with the behavior of the threat, including the number of times that the threat contacted other devices in the network, the information that the threat is attempting to access, the port scans of the threat on devices within the environment, or any other similar information about the threat. Based on the information state module 509 directs processing system 503 to determine a current state for the security threat within the environment. This current state may comprise a reconnaissance state, an exploit state, a persist state, a lateral movement state, an exfiltration state, or any other relevant state.

In addition to identifying the state for the threat, enrich module 510 directs processing system 503 to obtain enrichment information for the security threat. In some implementations, threat information may be obtained as the threat is reported to computing system 500. This threat information, which may be retrieved from security monitoring systems as well as the assets within the environment, may include IP information related to the threat, process names associated with the threat, websites or other addresses associated with the threat, users associated with the threat, or any other similar information associated with the threat. Based on the threat information provided, internal and/or external sources may be queried to receive additional information about the threat, such as whether the threat is a virus, Trojan, denial of service attack, or any other additional information.

After obtaining the enrichment information and the determining the current state of the threat, action module 511 directs processing system 503 to identify actions to be taken against the particular threat based on the enrichment information and current state. In some implementations, actions may be taken directly by computing system 500 without interaction by an administrator. However, in addition to or in place of the automated action, action module 511 may be configured to provide the identified actions to an administrator, allowing the administrator to select one or more of the actions to be implemented in the environment. To provide the actions, the actions may be displayed on user interface 502, or may be transferred via communication interface 501 to an external administration console device. Once the administrator selects actions from the provided suggested actions, computing system 500 may initiate implementation of the action within the environment.

In some implementations, to determine the actions to be taken against the threat, the enrichment information may be used to identify a rule set for a particular threat. For example, the enrichment information may identify that a particular process is a malicious virus that collects and transfers data to a remote location. Accordingly, a rule set may be identified for the malicious process, which is associated with actions that can be taken against the malicious process. Once the rule set is determined, the current state of the threat within the environment may be used to identify and organize a subset of security actions associated with rule set to respond to the threat. Accordingly, if the threat were in a more severe state, such as extracting data from the computing environment, computing system 500 may identify more drastic actions than if the threat were in a reconnaissance state. Further, when providing the security actions to an administrator for selection, the current state of the threat may be used to rank the security actions based on which action is most appropriate for the current state.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating an advisement system to provide security actions in a computing environment comprising a plurality of computing assets, the method comprising:
   identifying a security threat within the computing environment, wherein the security threat comprises a potentially malicious process executing on an asset of the plurality of computing assets;
   obtaining state information for the security threat, wherein the state information indicates at least one of: a type of information the security threat seeks to obtain, a type of computing system targeted by the security threat, and a communication path of the security threat;
   obtaining enrichment information about the potentially malicious process executing on the asset of the plurality of computing assets;
   determining that the potentially malicious process is a malicious process based on the enrichment information;
   determining a plurality of security actions for responding to the security threat based on the enrichment information and the state information for the security threat;

causing display of the plurality of security actions in a ranked order;
obtaining a selection of one or more security actions of the plurality of security actions; and
translating the one or more security actions into processes implemented on the asset of the plurality of computing assets.

2. The method of claim 1, wherein determining the plurality of security actions for responding to the security threat based on the enrichment information and the state information comprises:
identifying a rule set based on the enrichment information; and
identifying at least one security action associated with the rule set based on the state information.

3. The method of claim 1, further comprising determining, based on the state information, a current state of the security threat.

4. The method of claim 1, further comprising determining, based on the state information, a current state of the security threat, whether the current state is one of: a reconnaissance state, an exploit state, a persist state, lateral movement state, or an exfiltration state.

5. The method of claim 1, further comprising, in response to determining the plurality of security actions for responding to the security threat, initiating automated implementation of at least one security action in the computing environment.

6. The method of claim 1, wherein obtaining the enrichment information about the potentially malicious process comprises obtaining, from at least one internal or external database, the enrichment information for the potentially malicious process.

7. The method of claim 1, wherein the state information for the security threat further indicates identifiers for assets targeted by communications of the security threat.

8. The method of claim 1, wherein the security threat is one or more of: a virus, a denial of service attack, or a malware attack.

9. A non-transitory computer-readable storage medium storing instructions which, when executed by one or more processors, cause performance of operations comprising:
identifying a security threat within a computing environment, wherein the security threat comprises a potentially malicious process executing on an asset of a plurality of computing assets;
obtaining state information for the security threat, wherein the state information indicates at least one of: a type of information the security threat seeks to obtain, a type of computing system targeted by the security threat, and a communication path of the security threat;
obtaining enrichment information about the potentially malicious process executing on the asset of the plurality of computing assets;
determining that the potentially malicious process is a malicious process based on the enrichment information;
determining a plurality of security actions for responding to the security threat based on the enrichment information and the state information for the security threat;
causing display of the plurality of security actions in a ranked order;
obtaining a selection of one or more security actions of the plurality of security actions; and
translating the one or more security actions into processes implemented on the asset of the plurality of computing assets.

10. The non-transitory computer-readable storage medium of claim 9, wherein determining the plurality of security actions for responding to the security threat based on the enrichment information and the state information comprises:
identifying a rule set based on the enrichment information; and
identifying at least one security action associated with the rule set based on the state information.

11. The non-transitory computer-readable storage medium of claim 9, further comprising determining, based on the state information, a current state of the security threat.

12. The non-transitory computer-readable storage medium of claim 9, further comprising determining, based on the state information, a current state of the security threat, whether the current state is one of: a reconnaissance state, an exploit state, a persist state, lateral movement state, or an exfiltration state.

13. The non-transitory computer-readable storage medium of claim 9, further comprising, in response to determining the plurality of security actions for responding to the security threat, initiating automated implementation of at least one security action in the computing environment.

14. The non-transitory computer-readable storage medium of claim 9, wherein obtaining the enrichment information about the potentially malicious process comprises obtaining, from at least one internal or external database, the enrichment information for the potentially malicious process.

15. The non-transitory computer-readable storage medium of claim 9, wherein the state information for the security threat further indicates identifiers for assets targeted by communications of the security threat.

16. The non-transitory computer-readable storage medium of claim 9, wherein the security threat is one or more of: a virus, a denial of service attack, or a malware attack.

17. An apparatus, comprising:
one or more processors;
a non-transitory computer-readable storage medium storing instructions which, when executed by the one or more processors, causes the apparatus to:
identify a security threat within a computing environment, wherein the security threat comprises a potentially malicious process executing on an asset of a plurality of computing assets;
obtain state information for the security threat, wherein the state information indicates at least one of: a type of information the security threat seeks to obtain, a type of computing system targeted by the security threat, and a communication path of the security threat;
obtain enrichment information about the potentially malicious process executing on the asset of the plurality of computing assets;
determine that the potentially malicious process is a malicious process based on the enrichment information;
determine a plurality of security actions for responding to the security threat based on the enrichment information and the state information for the security threat;
cause display of the plurality of security actions in a ranked order;
obtain a selection of one or more security actions of the plurality of security actions; and translate the one or more security actions into processes implemented on the asset of the plurality of computing assets.

18. The apparatus of claim 17, wherein determining the plurality of security actions for responding to the security threat based on the enrichment information and the state information comprises:
 identifying a rule set based on the enrichment information; and
 identifying at least one security action associated with the rule set based on the state information.

19. The apparatus of claim 17, further comprising determining, based on the state information, a current state of the security threat.

20. The apparatus of claim 17, further comprising determining, based on the state information, a current state of the security threat, whether the current state is one of: a reconnaissance state, an exploit state, a persist state, lateral movement state, or an exfiltration state.

21. The apparatus of claim 17, further comprising, in response to determining the plurality of security actions for responding to the security threat, initiating automated implementation of at least one security action in the computing environment.

22. The apparatus of claim 17, wherein obtaining the enrichment information about the potentially malicious process comprises obtaining, from at least one internal or external database, the enrichment information for the potentially malicious process.

23. The apparatus of claim 17, wherein the state information for the security threat further indicates identifiers for assets targeted by communications of the security threat.

24. The apparatus of claim 17, wherein the security threat is one or more of: a virus, a denial of service attack, or a malware attack.

* * * * *